Dec. 6, 1960

Q. R. PETERSEN 2,962,820

MOLECULAR MODEL DEMONSTRATION APPARATUS

Filed Sept. 22, 1958

INVENTOR.
QUENTIN R. PETERSEN
BY
Harold B. Hood
ATTORNEY

Dec. 6, 1960   Q. R. PETERSEN   2,962,820
MOLECULAR MODEL DEMONSTRATION APPARATUS
Filed Sept. 22, 1958
2 Sheets-Sheet 2
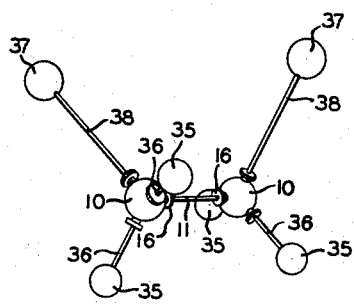
FIG_5
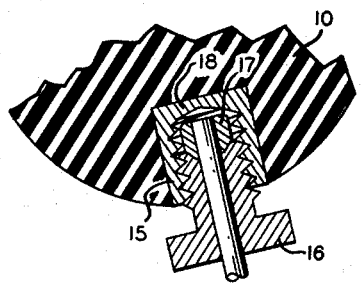
FIG_9
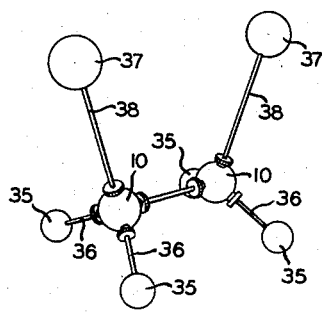
FIG_6
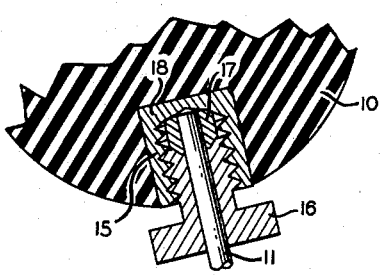
FIG_10
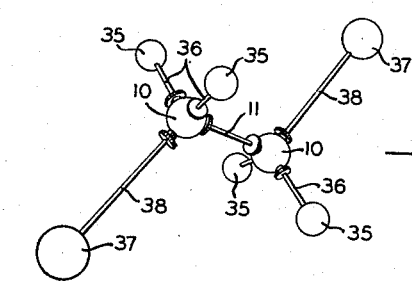
FIG_7
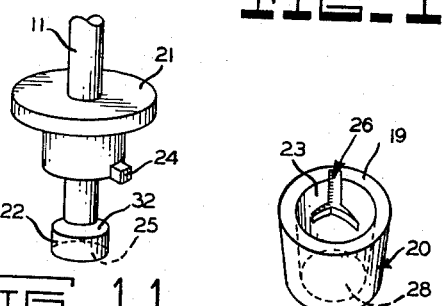
FIG_11   FIG_12
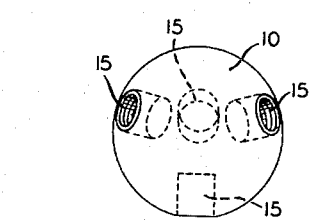
FIG_8
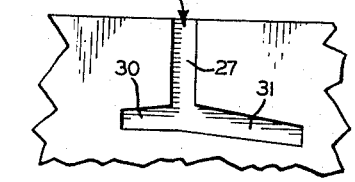
FIG_13
INVENTOR.
QUENTIN R. PETERSEN
BY
Harold B. Hood
ATTORNEY United States Patent Office
2,962,820
Patented Dec. 6, 1960

2,962,820

MOLECULAR MODEL DEMONSTRATION APPARATUS

Quentin R. Petersen, % Department of Chemistry, Wabash College, Crawfordsville, Ind.

Filed Sept. 22, 1958, Ser. No. 762,331

7 Claims. (Cl. 35—18)

The present invention relates to a method for representing the action of molecules and to apparatus for constructing stereochemical models, and more particularly relates to a method for representing chemical strain in molecules and/or the mobility of atoms of a molecule relative to one another and to apparatus for constructing molecular models from atom representations, chemical-bond representations and means for connecting said representations for use in chemical research and in the teaching of chemistry.

Molecular stereochemical models may be placed in two general classifications, rigid and movable; rigid models being those in which the atom representations of a particular model are fixed with relation to one another, and movable models being those in which the atom representations of a particular model are movable with respect to one another. The rigid model is superior to the movable model for permanent display and for close examination of the structure in the sense of order and position in three-dimensional space that the atom-representations bear to one another because of the greater capability of the rigid model of surviving extensive physical handling and examination. It is believed by those learned in chemical matters that an atom of a molecule attached to an adjacent atom of the molecule by a sigma bond usually has the property of being freely rotatable with respect to the adjacent atom about the chemical bond joining the two atoms. When such a property is provided in the movable type of stereochemical model, the model is more representative of the actual conditions believed to exist in molecules.

However, certain serious disadvantages exist in the rigid type of model and in the above-described "freely rotatable" movable type of model. The rigid type of model provides the implication that the form taken by the rigid model is the only conformation in which a particular molecule may exist. Also the rigid type of model cannot be used to show the transformation of one conformation of molecule to another conformation of the same molecule.

In certain of the "freely rotatable" movable type of models which I have examined, the following disadvantages have been present: first, manipulation of a multiatomic model molecule will frequently result in the unintentional disruption or breaking apart of the molecule because the device used to provide free rotation was the same device used to permit intentional separation of the atoms. In other words, the physical force applied to the molecule in the intentional separation of the atoms to break down the molecule is the same force used to demonstrate the movable nature of the molecule. Secondly, the physical force applied to the molecule in the intentional or unintentional demonstration of chemical strain (chemical strain being the strain introduced by one part of the molecule in acting on another part of the molecule) between the bonded atoms was qualitatively identical to the tension applied to separate the atoms intentionally, thus again frequently resulting in breaking up of the molecule when not desired. Thirdly, the position assumed by the models was affected by the force of gravity upon the models although the force of gravity has no effect upon the conformation of actual molecules.

This effect of gravity upon models possessing free rotation is, in fact, one which seriously interferes with the effective use of such a model since changes in position of support of the model will completely, and unreasonably, change its over-all conformation. In other words, the model "dangles" in a fashion determined by its point of support, a point with absolutely no chemical or physical significance.

It is, therefore, an object of the present invention to provide improved apparatus for constructing stereochemical models.

Another object of the present invention is to provide apparatus for constructing stereochemical models which have the advantages of both rigid and "freely rotatable" movable stereochemical models.

It is a further object of the present invention to provide apparatus for constructing stereochemical models in which the chemical-bond representation between a given pair of atoms may selectively provide "free rotation" of one atom with respect to the other or alternatively provide a rigid connection between the pair of atoms.

Still a further object of the present invention is to provide apparatus for constructing a stereochemical model which can be subjected to conditions representing chemical strain and which will assume conformations illustrating the conformation of actual molecules under such chemical strain.

Still another object of the present invention is to provide apparatus for constructing a stereochemical model which can be subjected to conditions representing chemical strain and which will assume conformations providing useful information regarding actual molecules under such chemical strain.

A further object of the present invention is to provide a method for representing the action of molecules.

Another object of the present invention is to provide a method for representing the mobility of atoms in a molecule.

Still another object of the present invention is to provide a method for representing chemical strain in a molecule.

Still further objects of the present invention will become apparent as the description proceeds.

To the accomplishment of the above and related objects, my invention may be embodied in the forms illustrated in the accompanying drawings and in the steps described in the following specification, attention being called to the fact, however, that the drawings are illustrative only, and the specific procedure described is by way of illustration only, and that change may be made in the specific construction illustrated and described and in the specific steps stated, so long as the scope of the appended claims is not violated.

Fig. 5 is a perspective view of a stereochemical model constructed from the apparatus embodying the present invention and representing a "skew" form of 1,2-dibromoethane;

Figs. 6 and 7 are views similar to Fig. 5, however, representing 1,2-dibromoethane in its eclipsed and opposed forms, respectively;

Fig. 8 is an enlarged side view of a spherical member representing a carbon atom and forming a portion of the apparatus embodying the present invention;

Fig. 9 is an enlarged fragmentary sectional view illustrating in detail means for connecting the atom representations and the chemical-bond representations of the present apparatus selectively in a swivel connection or in a rigid connection, Fig. 9 showing the means in its swivel-connection position;

Fig. 10 is a view similar to Fig. 9 showing the connecting means in its rigid connection position;

Fig. 11 is a perspective view of a portion of an alternative means for attaching the atom representations to the bond representations in a swivel or a rigid connection;

Fig. 12 is a perspective view of the remaining portion of the means illustrated in Fig. 11; and Fig. 13 is an enlarged, fragmentary view showing certain details of the portion of the connecting means illustrated in Fig. 12.

Figure 1:
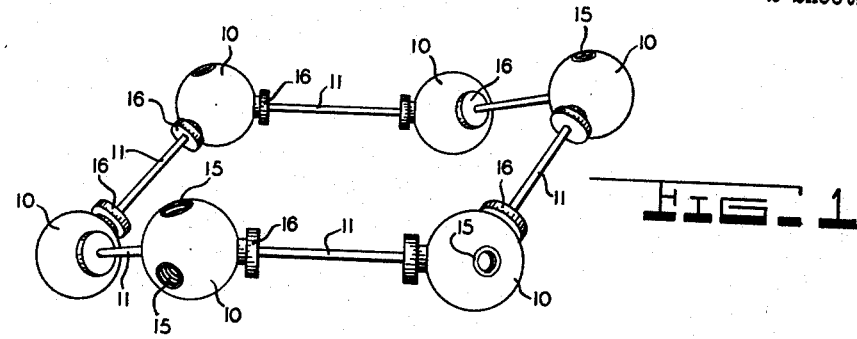
Fig. 1 is a perspective view of a stereochemical model constructed from the apparatus embodying the present invention and representing a number of carbon atoms connected in accordance with the six-carbon-atom arrangement of the cyclohexane system.

Referring now to the drawings, it will be seen that I have shown in Fig. 1 a stereochemical model of the six-carbon-atom structure of a cyclohexane molecule which includes six balls or spherical members 10—10 representing carbon atoms connected in the form of a ring by six rods or chemical-bond-representing members 11—11. The carbon representing balls 10, one of which is shown in detail in Fig. 8, are composed of a hard material capable of a standard or uniform elastic distortion such as neoprene, rubber or any material which uniformly possesses a perfect return following distortion. As is perhaps best shown in Figs. 8–10, each carbon-atom-representing spherical member 10 has four sockets, cups or internally threaded elements 15—15 embedded therein in such a manner that the axes of the threaded portions of the sockets 15—15 extend radially of the spherical member 10 and form equal angles with one another of 109.5°.

The bond-representations 11 may be connected to the spheres 10 so as to be held within the sockets 15 and axially of the threaded portions of the sockets 15 either in a swivel connection with the rods 11 rotatable about their own axes relative to the spheres 10 or in a rigid connection. In the form of the invention shown in Figs. 9 and 10, each of the bond representations 11 is provided with a pair of male-threaded sleeves 16—16 which are swivelled upon the rods 11 so as to be independently slidable upon the rods and rotatable about the rods. Each rod 11 has an enlarged head 17—17 at each end thereof which may be held in a socket 15 in a fixed connection as in Fig. 10 or in a swivel connection as in Fig. 9 either by turning down the sleeve 16 to such a degree as to clamp the head 17 of the rod against the base 18 of the internally threaded element or by threading the sleeve 16 loosely into the internally threaded element 15, respectively.

Figs. 11, 12 and 13 depict an alternative means for attaching the atom representations to the chemical-bond representations in either a swivel connection or a rigid connection. A cup 20 is substituted for the internally threaded element or socket 15 and is embedded within the rubber atom-representing sphere 10 in a manner similar to the embedding of the internally threaded element 15 and so that the open end 19 of the cup 20 opens outwardly of the sphere 10. A thimble 21 takes the place of the threaded sleeve 16 and is swivelled or slidably and rotatably mounted upon the rod 11 in a manner similar to the mounting of the sleeve 16. The cup 20 has a hollow interior cylindrical portion 23 the axis of which is arranged radially of the sphere 10. The hollow portion 23 is formed with a T-shaped channel or indentation 26, the stem of the T-shaped indentation beginning at the open end 19 of the cup 20 and extending longitudinally of the interior cylindrical portion 23. Each of the two arms 30 and 31 of the T-shaped indentation 26 is shaped with a decreasing width so as to provide a means for frictionally gripping and holding a projecting member 24 fixedly attached to the thimble 21.

The rod 11 has an enlarged head 22 similar to the enlarged head 17 above described, said enlarged head 22 having a flat portion 25 upon its distal surface. The surface 25 is flat so that when it is pressed into engagement with a flat base 28 of the cup 20 friction will produce a rigid connection between the cup 20 and the head 22.

The rod 11 may be attached to the carbon atom representation 10 in a swivel, freely rotatable connection by inserting the head 22 of the rod into the cup 20 and by inserting the thimble 21 into the cup 20 causing the projection 24 to move along the stem of the T-shaped indentation 26 and by rotating the thimble 21 so that the projection 24 moves into and is held by the arm 30 of the T-shaped indentation, the arm 30 being so proportioned and arranged as to be substantially parallel with the open end 19 of the cup 20. When the apparatus is in such a position, the head of the rod is loosely held within the cup 20 in such a manner that the rod is maintained radial to the sphere 10 but so as to allow swivelling or rotation of the rod about its own axis with respect to the sphere 10. In order to fix the rod 11 with respect to the sphere 10, the thimble 21 is turned in the cup 20 so that the projection 24 moves into the arm 31 of the T-shaped indentation. The arm 31 is so proportioned and arranged as to angle from the stem of the T-shaped indentation in a direction away from the open end 19 of the sleeve 20. Thus, by turning the projection into the arm 31, the thimble is caused to force against the head 22 of the rod holding it fixedly against the base 28 of the cup 20 and connecting the rod 11 fixedly to the spherical member 10.

As has been above explained, the spherical members 10 are intended to represent carbon atoms and it will be understood that the four sockets 15 of each carbon atom represent the fact that the chemical valence of carbon is four. In like manner other atoms having different valences may be represented. For example, two such sockets for receiving two chemical-bond-representing members 11 might be provided in a spherical member similar to the member 10 to represent an atom of oxygen. In the case of an atom having a valence of one, there is no real reason, in representing certain molecules, for making the atom-representing member rotatable with respect to its single chemical-bond-representing member; therefore, the bond-representing member may be manufactured fixed within the atom representing member as in the case of hydrogen-atom-representing spheres 35—35 (Figs. 5–7) and rods 36—36 representing their chemical bonds and bromine-atom representing spheres 37—37 and their chemical-bond-representing rods 38—38. It will be noted that the bromine atom is represented by a larger sphere than that of the hydrogen atom, by a longer chemical-bond-representing rod and may be represented by a different color than the hydrogen atom, such as, for example, reddish brown as opposed to white for hydrogen.

Referring now to Figs. 5–7, the 1,2-dibromoethane-molecule-representing model therein depicted is an excellent example for illustrating at least a portion of the usefulness of the present invention. The model of Fig. 5 represents the 1,2-dibromoethane molecule in its "skew" form and comprises a pair of carbon-representing spheres 10 connected by a single chemical-bond-representing rod 11. Each of the two carbon spheres 10 has two hydrogen-atom-representing spheres 35 connected thereto by their chemical-bond-representing rods 36 and one bromine-representing-atom 37 connected thereto by its chemical-bond-representing rod 38. As can be seen from the drawing, the "skew" form of the molecule is one in which the hydrogen and the bromine atoms of each branch are not directly opposed to each other as in the "opposed" form of Fig. 7 nor across from each other as in the "eclipsed" form of Fig. 6.

Because of the differing bulk and/or bond lengths of the bromines it is impossible to hold a conformation such as depicted in Fig. 5 in a model possessing free rotation, without the careful use of both hands, under which conditions the model would, of course, be partially obscured. Therefore, in order to examine this structure carefully, a rigid model must be used and the threaded sleeves 16 upon the rod 11 may be tightened, or the thimbles 21 may be adjusted to turn their projections 24 into the branches 31, to produce such a result. However, a rigid model is not capable of undergoing rotation to the two other forms of dibromoethane, the "eclipsed" form of Fig. 6 and the "opposed" form of Fig. 7. To change the conformation of the molecule represented by the model as shown in Fig. 5 to the conformations of Figs. 6 and 7, it is only necessary to release either of the two threaded sleeves 16 of the chemical bond representation 11 connecting the two carbon atoms 10 so as to allow either of the carbon atoms 10 to be rotated with respect to the other of the carbon atoms 10. When the model has taken the form desired, the threaded sleeve 16 may then be retightened so that the model will retain the new form. Thus a research worker or student may not only examine the molecular conformation of the molecule while held rigidly in a particular conformation but he may learn much by watching the changes in position made by each individual atom while a conformational change is in progress.

Figure 2:
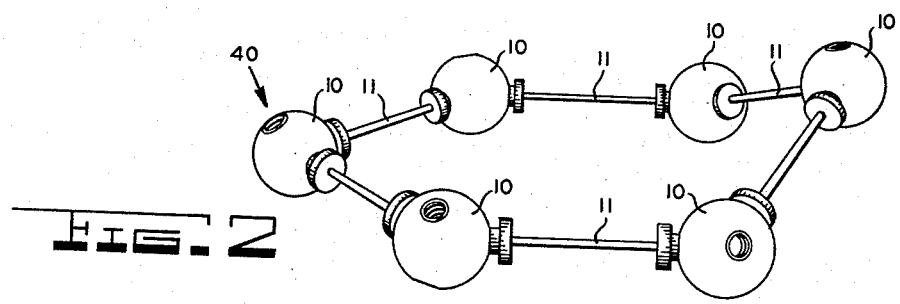
Figs. 2 and 3 are figures similar to Fig. 1 representing alternative conformations of the six-carbon-atom arrangement in a cyclohexane molecule.
Figure 3:
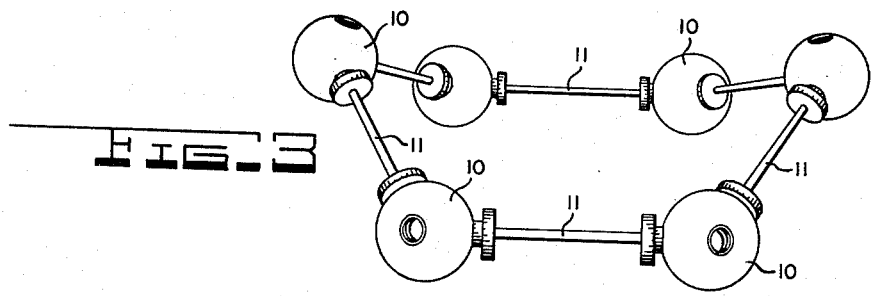
Figure 4:
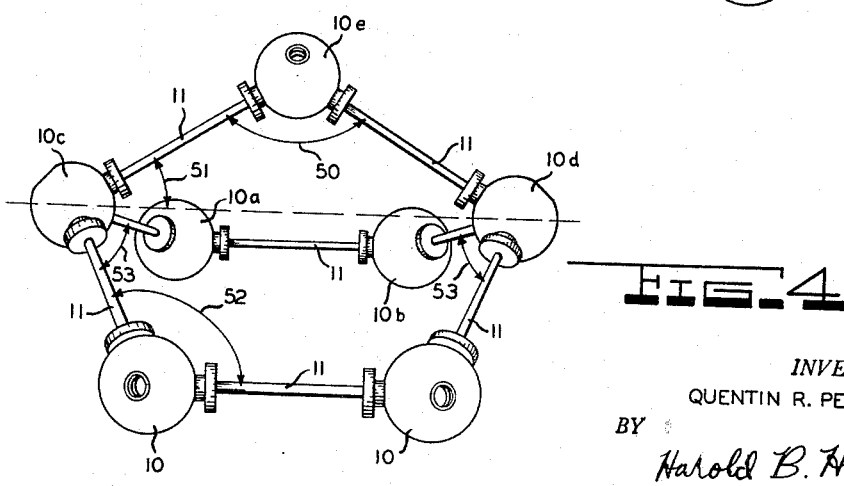
Fig. 4 is a perspective view of a stereochemical model constructed from the apparatus embodying the present invention and representing the basic carbon structure of nor-bornane.

Referring again to Fig. 1 and also to Figs. 2 through 4, the alicyclic systems in general, and the cyclohexane system in particular, provide excellent examples of the use of models constructed in accordance with my invention. The cyclohexane system is known to exist in two conformational forms known as the "chair" and "boat" forms which are illustrated in Figs. 1 and 3, respectively. To convert a model of the chair form to the boat form (and also to convert a molecule of the chair form to a molecule of the boat form) it is necessary, by free rotation, to pass through a conformation of the molecule in which the chemical bonds connecting the carbon atoms are not all at angles of 109.5° to each other. If, as an assumption, it is taken that all of the angular distortion is assumed by the rubber carbon-atom-representing sphere 10 indicated at 40 in Fig. 2, then the angle between the carbon bonds extending from this atom must proceed from the angle 109.5° as in Fig. 1 to an angle of 120° in the transition state depicted by the model in Fig. 2 and back to 109.5° as shown in Fig. 3. A model not having secure linking means such as those of the present invention connecting the bond representations to the atom representations would almost certainly be pulled apart by such a transition.

Although the above assumption of strain localization at a single atom is a common one, made for ease of visualization and calculation, it certainly does not represent the effect of such strain on an individual cyclohexane molecule. Actually the transformation must go through a transition state in which the strain is distributed over all of the angles in a fashion which demands the least input of energy. The standardized elasticity of each elastic sphere 10 permits an automatic distribution of the strain produced during such a transformation to all of the carbon-representing spheres of the ring and thus produces a change in all of the various bond angles, thus more closely representing what are believed to be the actual conditions present in such a molecule going through such a transition.

Thus a true picture of molecular behavior is obtained by the combination of non-disruptability, free rotation and standardized elasticity present in models shown in Figs. 1-3 and constructed in accordance with the present invention. The research possibilities of the present apparatus are indicated by a comparison of the measurements of the effect of strain upon substituents in alicyclic systems (done with a ruler on models similar to those of Figs. 1-3) with the conclusions of Corey and Sneen (J. Am. Chem. Soc. 77, 2505 (1955)) who performed three dimensional vector analysis upon the same several systems. It was found that when their assumptions were valid (i.e., either no strain or equally distributed strain) the results obtained from the two methods were identical. When their assumptions involved unjustified strain localization, the measured values differed from the calculated values. The use of the present invention in a case such as above described offers a much more rapid method of obtaining information than by calculation and avoids the unjustified assumption of strain localization.

In addition to the evaluations of strain effects, the models such as those shown in Figs. 1-3 permit examination of the freedom of motion found in such alicyclic systems. The chair conformation shown in Fig. 1 is rigid in the sense that all of the atoms retain their positions relative to one another even though free rotation is permitted. Any alteration of the relative position of the atoms would involve an energy input by chemical strain such as has been described above. When a model of the chair form is constructed with the apparatus of the present invention, the molecular model shows clearly this rigidity. However, when a model of the boat form such as is depicted in Fig. 3 is constructed, free rotation is found to permit the model to assume an infinite number of conformations without introducing any strain of bond angle distortion which represents the actual condition present in a boat form of molecule. The design of the atom-representation-bond-representation connecting means of the present invention permits locking of the atoms of the boat form into a condition of non-free rotation so that any conformation of the boat form can be freely examined.

Referring to Fig. 4, another example of the usefulness of the present apparatus will be related. The structure of non-bornene is essentially a molecule formed by one carbon bridge incorporating two carbon atoms, such as the atoms 10a and 10b in Fig. 4, connecting atoms 10c and 10d of the model depicted in that figure. In forming such a carbon bridge, the assumption might be made that the strain introduced will be distributed among the carbon atoms represented by the spheres 10c, 10d and 10e. The analytically calculated distortions so produced are angle 50 equals 116° and angle 51 equals 32° (angle 51 being measured between the rod 11 and a line connecting the centers of spheres 10c and 10d). A model of this molecule may be easily constructed with the apparatus of the present invention and, upon measurement with a protractor, shows angle 50 to be 91° and angle 51 to be 42°. Especially significant is that angle 50, which is calculated to be 6.5° over its tetrahedral angle of 109.5° is actually compressed to 13.5° less than its tetrahedral angle in the model. The explanation of this large difference is found upon examination of the remaining angles 52 and 53—53. The five angles between the chemical bonds connecting the carbon atoms of the ring of which the angle 52 is representative are found to be 104° instead of their assumed 109.5°, while the angles 53, which because of their position on atoms 10c and 10d might be expected to distort considerably, are quite unchanged from their normal tetrahedral angle. Thus a more correct result is obtained from the factors of standardized elasticity and free rotation than can be obtained from the assumption of strain localization necessary for a workable vector solution.

Therefore it can be easily seen that the apparatus of the present invention can be used to construct models well suited for teaching stereoisomerism and stereochemistry and also is well suited for research in these topics. Although they have not been illustrated in the accompanying drawings, it will be obvious to those skilled in the art that certain modifications, such as "pi" bond representations on trigonal double bonds and representations of aromatic systems, could be used with the present invention so as to produce an excellent teaching and research tool.

I claim as my invention:

1. Apparatus for constructing stereochemical models comprising a first type of members representing atoms and a second type of members representing chemical bonds for joining atoms, one of said types being formed to provide a socket adapted to receive a substantially cylindrical portion of the other of said types upon an axis substantially radial with respect to the center of said first type of member, a sleeve mounted for rotation about the axis of each of such cylindrical portions, each said sleeve and its cylindrical portion being provided with cooperating surfaces limiting movement of said sleeve toward the distal end of its cylindrical portion, the axial depth of each such socket exceeding the axial distance between said cooperating surface of each cylindrical portion and the distal extremity of such portion, and each socket and each sleeve being formed to provide mutually-cooperative cam surfaces for locating said sleeve selectively with its first-named cooperative surface spaced from the bottom of such a socket either by a distance equal to, or by a distance greater than, the said distance between said cooperating surface of said cylindrical portion and the distal extremity of said portion.

2. Apparatus for constructing stereochemical models comprising spherical members representing atoms, said members composed of material having standardized elasticity, elongated slender members representing chemical bonds for joining atoms, means for securing the atom-representing members to the bond-representing members so that said bond-representing members are held radially of said spherical atom-representing members, said securing means comprising a sleeve mounted for rotation about the axis of each bond-representing member adjacent each end thereof, each said sleeve and its bond-representing member being provided with cooperating surfaces limiting the movement of said sleeve axially toward the corresponding end of said bond-representing member, and each atom-representing member being formed to provide a socket proportioned and designed to receive an end of a bond-representing member and a portion of its corresponding sleeve, the axial depth of each such socket exceeding the axial distance between the extremity of said member end and said cooperating surface on said bond-representing member, said socket and said sleeve further being formed to provide mutually-cooperating cam surfaces for locating said sleeve selectively with its first-named cooperating surface spaced from the bottom of said socket either by a distance equal to, or by a distance greater than, the said distance between said extremity of said bond-representing member and said cooperating surface of said bond-representing member.

3. In apparatus for constructing stereochemical models including atom-representing members and chemical-bond-representing members for joining atoms, means for securing the atom-representing members to the chemical-bond-representing members comprising internally threaded elements embedded in said atom-representing members, said chemical-bond-representing members having enlarged heads thereon for insertion in said internally threaded elements, and male threaded sleeves swivelled upon said chemical-bond-representing members for holding said enlarged heads within said internally threaded elements, each such sleeve having an axially facing, internally tapering surface cooperative with an oppositely-facing, tapered external surface on its associated head.

4. Apparatus for constructing stereochemical models comprising spherical members representing atoms, said members being composed of material having standardized elasticity, internally threaded elements embedded within said spherical members, with the axes of the threaded portions arranged radially of the respective spherical member within which the element is embedded to define outwardly-opening sockets, elongated slender members representing chemical bonds for joining atoms, each of said elongated slender members having at each end an enlarged head insertable within any one of such sockets, and a pair of male threaded sleeves swivelled upon each of said chemical-bond-representing members adapted for engaging said internally threaded elements for holding respective enlarged heads within respective sockets, each such sleeve having an axially-facing surface selectively cooperative with an oppositely-facing surface on its associated head to retain said head rotatively within such a socket or to clamp said head against rotation in such a socket.

5. In apparatus for constructing stereochemical models including atom-representing members and chemical-bond-representing members for joining atoms, means for securing the atom-representing members to the chemical-bond-representing members comprising a cup embedded in such an atom-representing member, said cup having a hollow cylindrical interior portion the open end of which opens outwardly of said atom-representing member, said cup having a T-shaped indentation in said interior portion, the stem of said T-shaped indentation beginning at said open end of said interior portion and extending longitudinally of said interior portion, one of the two arms of said T-shaped indentation angling from the stem of said T-shaped indentation in a direction away from said open end, each of said chemical-bond-representing members having an enlarged head thereon for insertion in such a cup, and a thimble swivelled upon said chemical-bond-representing member, and proportioned for insertion in said sleeve, said thimble having a projection adapted for slidably passing along the base of said T-shaped indentation and for selectively engaging either arm of said T-shaped indentation to hold said enlarged head tightly in rigid connection with said atom-representing member and alternatively to hold said enlarged head loosely in a swivel connection with said atom-representing member.

6. Apparatus for constructing stereochemical models comprising spherical members representing atoms, said members being composed of material having standardized elasticity, cups embedded in said atom-representing members, said cups having hollow cylindrical interior portions the axes of which are arranged radially of said spherical members, the open end of each of said hollow cylindrical interior portions opening outwardly of said spherical members, said cups each having a T-shaped indentation in its interior portion, the stem of each of said T-shaped indentations beginning at said open end of said interior portion and extending longitudinally of said interior portion, one of the two arms of said T-shaped indentation angling from the stem of said T-shaped indentation in a direction away from said open end, elongated slender members representing chemical bonds for joining atoms, each of said elongated slender members having at each of its ends an enlarged head insertable within such a cup, and a pair of thimbles swivelled upon each of said chemical-bond-representing members and proportioned for insertion in said sleeve, each of said thimbles having a projection adapted for slidably passing along the stem of said T-shaped indentation and for selectively engaging either arm of said T-shaped indentation to hold said enlarged head tightly in rigid connection with said atom-representing member and alternatively to hold said enlarged head loosely in a swivel connection with said atom-representing member.

7. In apparatus for constructing stereochemical models including atom-representnig members and chemical-bond-representing members for joining atoms, means for securing the atom-representing members to the chemical-bond-representing members comprising a cup embedded in such an atom-representing member, said cup having a hollow cylindrical interior portion the open end of which opens outwardly of said atom-representing member, each of said chemical-bond-representing members having an integrally fixed enlargement thereon adjacent an end thereof, sleeve means slidably and rotatably mounted on each of said chemical-bond-representing members and having an axially-facing surface engageable with a proximal surface on the enlargement of said member, any one of said heads and a portion of the associated sleeve means being insertable in any one of said cups, and cooperating cam means on said sleeve means and said cups engageable to hold any one of said sleeve means in a selected cup to provide, by selective adjustment of said sleeve means relative to such cup, either a rigid connection between a head and a cup or alternatively a swivel connection between said head and said cup.

References Cited in the file of this patent

UNITED STATES PATENTS

| | | |
|---|---|---|
| 1,851,159 | Dodge | Mar. 29, 1932 |
| 2,308,402 | Taylor | Jan. 12, 1943 |
| 2,920,400 | Subluskey | Jan. 12, 1960 |

FOREIGN PATENTS

| | | |
|---|---|---|
| 1,101,229 | France | Apr. 20, 1955 |

OTHER REFERENCES

Chicago Apparatus Co.: Catalog No. 55; page 682. Copyrighted 1954 Q/185/C53. Article: Master Crystal Models.

The Review of Scientific Instruments—August 1953—vol. 24, No. 8, pages 621–627.

Eimer and Amend Catalog of 1936, page 618, Atomic Models (Item No. 28,599)—QD/53/E54/1936.